(12) United States Patent
Ou et al.

(10) Patent No.: US 7,206,653 B1
(45) Date of Patent: Apr. 17, 2007

(54) WAFER-BASED PLANNING METHODS AND SYSTEMS FOR BATCH-BASED PROCESSING TOOLS

(75) Inventors: Ming-Feng Ou, Hsinchu (TW); Gwo-Chiang Fang, Pingjhen (TW); Chao-Fan Chang, Hsinchu (TW); Ju-Kau Chen, Changhua (TW); Oliver Wu, Nanjhuang Township, Miaoli County (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 0 days.

(21) Appl. No.: 11/288,489

(22) Filed: Nov. 29, 2005

(51) Int. Cl.
*G06F 19/00* (2006.01)
(52) U.S. Cl. .................................... 700/99
(58) Field of Classification Search ........... 700/28–30, 700/95–97, 99–101, 117–121
See application file for complete search history.

(56) References Cited

U.S. PATENT DOCUMENTS

| | | | |
|---|---|---|---|
| 6,687,563 B1 | 2/2004 | Wang et al. | 700/121 |
| 7,027,885 B1 * | 4/2006 | Barto et al. | 700/99 |
| 7,043,322 B1 * | 5/2006 | Denton et al. | 700/100 |
| 2002/0116086 A1 * | 8/2002 | Huber et al. | 700/121 |
| 2002/0160621 A1 * | 10/2002 | Joma et al. | 438/758 |
| 2003/0120371 A1 * | 6/2003 | Joma et al. | 700/100 |
| 2003/0225474 A1 * | 12/2003 | Mata et al. | 700/121 |
| 2005/0113950 A1 * | 5/2005 | Brown | 700/97 |
| 2005/0256599 A1 * | 11/2005 | Peng | 700/100 |
| 2006/0074522 A1 * | 4/2006 | Liang et al. | 700/223 |
| 2006/0265162 A1 * | 11/2006 | Muro et al. | 702/84 |

* cited by examiner

*Primary Examiner*—M. N. Von Buhr
(74) *Attorney, Agent, or Firm*—Thomas, Kayden, Horstemeyer & Risley

(57) ABSTRACT

Computer-implemented wafer-based planning methods for batch-based processing tools. Tool groups are appended in a tool group level of planning data provided by a MES for converting planning data from batch-based to wafer-based data. The planning data with appended tool group is applied to dispatch processing tools.

18 Claims, 3 Drawing Sheets

WAFER-BASED PLANNING METHODS AND SYSTEMS FOR BATCH-BASED PROCESSING TOOLS

BACKGROUND

The present invention relates to wafer manufacturing methods, and in particular to computer-implemented wafer-based planning methods and systems for batch-based processing tools.

In integrated circuit (IC) related manufacturing foundries, such as semiconductor product foundries, a manufacturing execution system (MES) is generally utilized for manufacturing control. In a MES database, product manufacture is mapped by processing routes, each of which is composed by numerous operations. One important function of a MES is to provide planning data for processing tools.

In an exemplary MES system, planning data can comprise several levels, such as operations, tool group set, tool group, and tool levels. The operations level comprises operations for IC product manufacture. The tool group set level comprises different functional tool group sets. Each tool group set may comprise multiple tool groups, and each tool group corresponds to a specific processing tool.

Arriving materials, such as wafers, are processed and sorted into batches or lots in a batch-based processing tool. Thus, planning data provided by a MES corresponding to a batch-based processing tool is also based on batches. For example, if a batch-based processing tool PT-A allows a maximum of 25 wafers for a specific operation OP1, the related planning data is recorded in a MES database and based on batches. When one batch of 10 wafers arrives at the processing tool PT-A, the processing tool PT-A verifies the batch of 10 wafers according to planning data in the MES database.

The processing tool may determine that the batch of 10 wafers corresponds to the processing tool PT-A according to the planning data in the MES database. The batch of 10 wafers is then processed by processing tool PT-A by operation OP1 even if the wafer number does not reach the complete number, creating resource waste of processing tools.

FIG. 1a is a diagram of a conventional operating method of batch-based processing tools, in which the capacity of a batch-based processing tool 106 is 25, and arriving batch 100, comprising 25 wafers, is processed thereby. When batch 102 of 10 wafers arrives, it can be processed directly. Thereafter, arriving batch 104 of 2 wafers must wait for processing of batch 102. Due to capacity of batches 102 and 104 are incomplete, whole throughput is decreased. Thus, it is important for wafer-based planning data for batch-based processing tools to be employed.

U.S. Pat. No. 6,687,563 discloses an integrated method of dispatching and scheduling tools for 300 MM full automation FAB. The method disclosed, however, focuses on integration of short-term and long-term production plans. The presently provided methods and systems are mainly characterized by provision of wafer-based planning data for batch-based processing tools to resolve resource waste problems thereof.

SUMMARY

An embodiment of the invention provides computer-implemented wafer-based planning methods for batch-based processing tools. Planning data comprises operations, tool group set, tool group, and tool levels is provided. The operations level comprises multiple operations. Each operation corresponds to one tool group set in the tool group set level, one tool group in the tool group level, and one batch-based processing tool in the tool level. Tool groups are appended to the tool group level for each operation in the operations level. The appended number of tool groups depends on wafer capacity of the batch-based processing tool.

BRIEF DESCRIPTION OF THE DRAWINGS

The present invention can be more fully understood by reading the subsequent detailed description and examples with references made to the accompanying drawings, wherein.

DESCRIPTION

Figure 2:
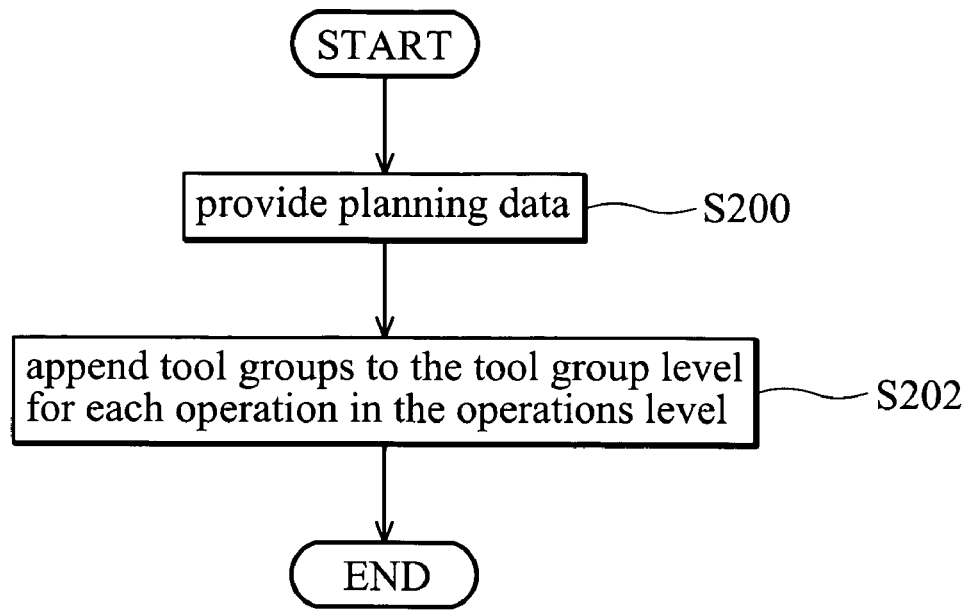
FIG. 2 is a flowchart of an embodiment of a computer-implemented wafer-based planning method for batch-based processing tools.

FIG. 2 is a flowchart of an embodiment of a computer-implemented wafer-based planning method for batch-based processing tools. Planning data is provided (step S200). The planning data may be provided by a manufacturing execution system (MES) for the batch-based processing tools. The planning data comprises operations, tool group set, tool group, and tool levels. The operations level comprises operations and each operation corresponds to one tool group set in the tool group set level, one tool group in the tool group level, and one batch-based processing tool in the tool level.

Tool groups are appended to the tool group level for each operation in the operations level (step S202). The number of appended tool groups depends on wafer capacity of the batch-based processing tool and indexed from one to the maximum capacity of the batch-based processing tool.

Here, tool group selection rules corresponding to the appended tool groups are also appended. When wafers arrive at the batch-based processing tool, a target tool group is selected therefrom according to the wafer number and the tool group selection rules.

Thereafter, planning data with the appended tool groups can be provided for dispatch of the batch-based processing tools.

An integrated circuit product manufactured by a computer-implemented wafer-based planning method for batch-based processing tools is provided. The method comprises the disclosed steps.

Figure 4:
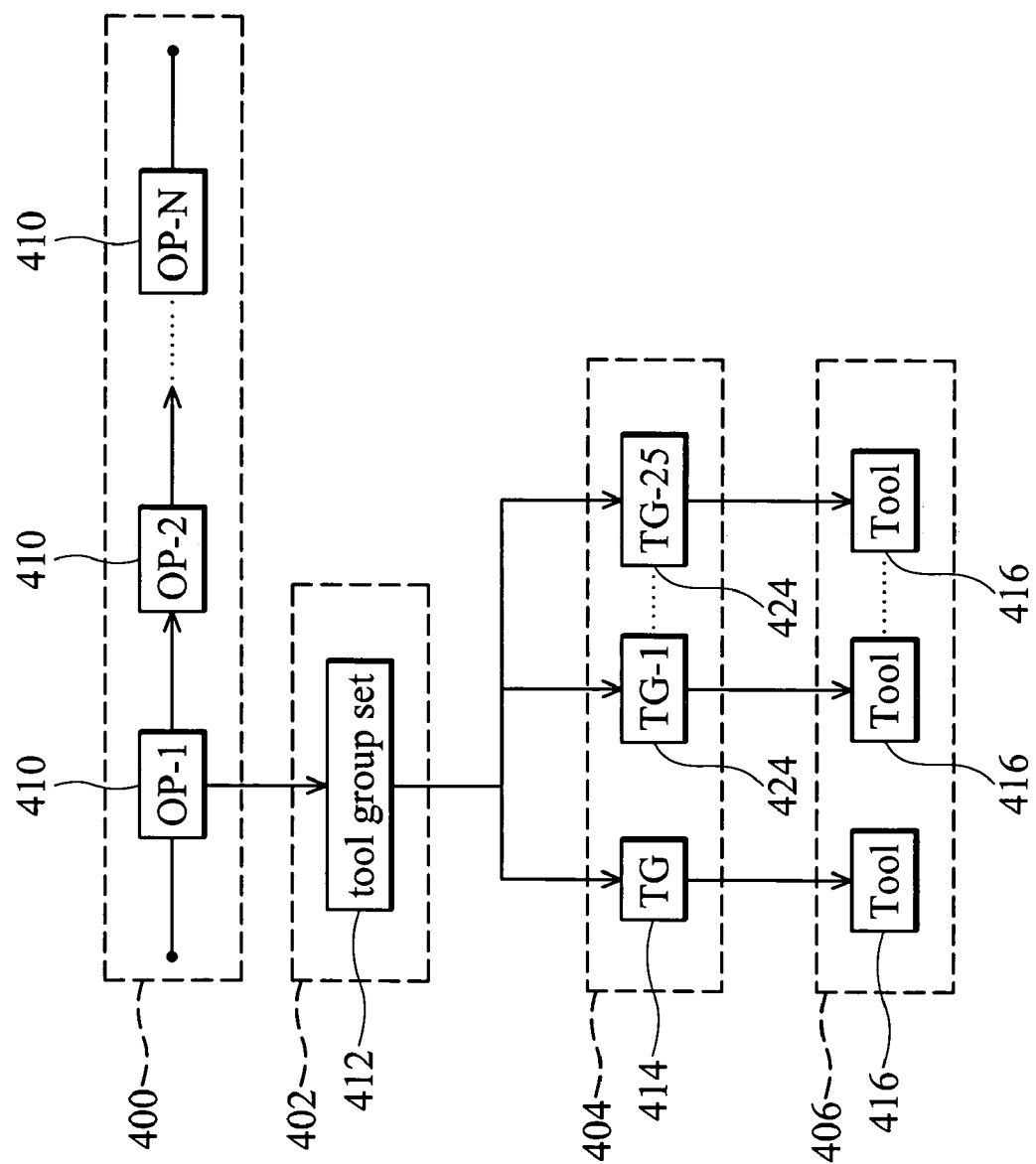
FIG. 4 is a diagram of an exemplary implementation of appending tool groups.

FIG. 4 is a diagram of an exemplary implementation of appending tool groups. Planning data provided by a MES for batch-based processing tools may comprise operations level 400, tool group set level 402, tool group level 404, and tool level 406. The operations level 400 comprises operations 410. Each operation 410 corresponds to one tool group set 412 in the tool group set level 402, one tool group 414 in the tool group level 404, and one batch-based processing tool 416 in the tool level 406.

Tool groups 424 are appended to the tool group level 404. The appended number depends on the maximum wafer capacity of the batch-based processing tool and indexed from one to the maximum capacity of the batch-based processing tool, as shown in FIG. 4, from 1 to 25.

Tool group selection rules corresponding to the appended tool groups may also be appended. The tool group selection rules can comprise optional conditions for tool group selection. Thereafter, when wafers arrive at a batch-based processing tool, a target tool group may be accurately selected from the tool groups by reference to wafer number and tool group selection rules.

Figure 3:
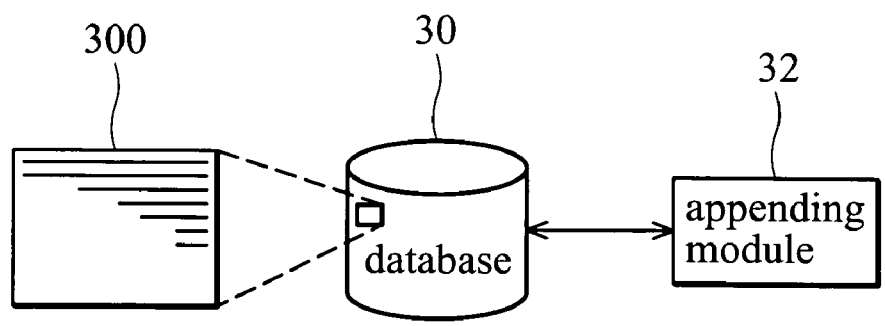
FIG. 3 is a diagram of an embodiment of a wafer-based planning system for batch-based processing tools.

FIG. 3 is a diagram of an embodiment of a wafer-based planning system for batch-based processing tools. The wafer-based planning system for batch-based processing tools comprises a database 30 and an appending module 32.

The database 30 provides planning data 300, comprising operations, tool group set, tool group, and tool levels. The operations level comprises operations and each operation corresponds to one tool group set in the tool group set level, one tool group in the tool group level, and one batch-based processing tool in the tool level.

The appending module 32, coupled to database 30, appends tool groups to the tool group level for each operation in the operations level.

The number of the appended tool groups depends on the wafer capacity of the batch-based processing tool and indexed from one to the maximum capacity of the batch-based processing tool.

Here, again, tool group selection rules corresponding to the appended tool groups are also appended for tool group selection. For example, when wafers arrive at the batch-based processing tool, a target tool group is selected from the tool groups according to wafer number and the tool group selection rules.

Figure 1A:
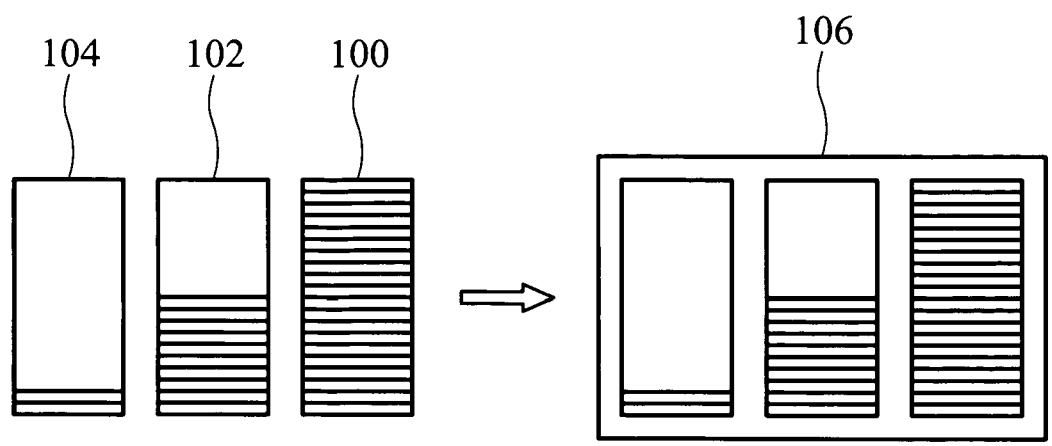
FIG. 1a is a diagram of a conventional operating method for batch-based processing tools.
Figure 1B:
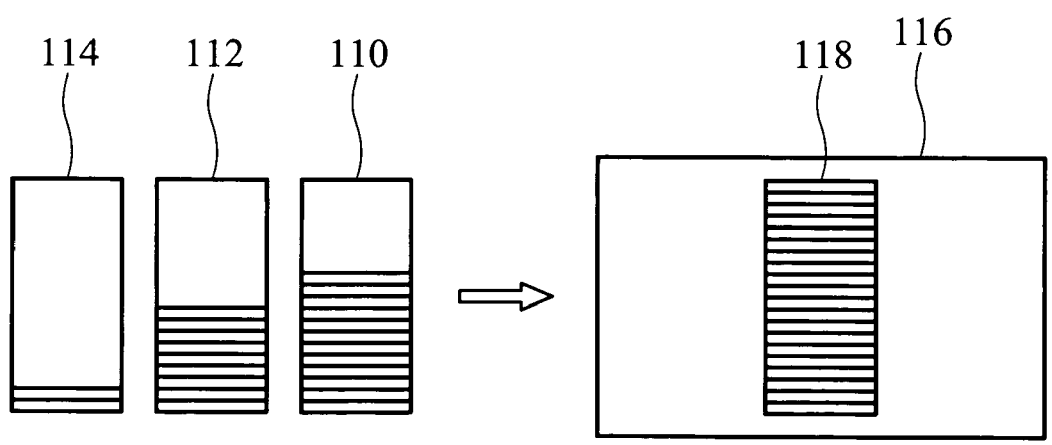
FIG. 1b is a diagram of a complete operating method for batch-based processing tools.

FIG. 1*b* is a diagram of a complete operating method of batch-based processing tools. The maximum wafer capacity of a batch-based processing tool is 25 and wafer batches 110, 112, and 114 arrive at processing tool 112. The batches 110, 112, and 114, comprise 13, 10, and 2 wafers, respectively. By applying the inventive methods, the batch-based planning data is converted to wafer-based data. Thus, a batch 118 of the maximum wafer capacity 25 of the processing tool 116 is processed.

Comparing FIG. 1*a* with FIG. 1*b*, the batch-based processing tool is applied to full: batches after application of the inventive methods, resolving resource waste and process downtime. The provided methods and system can also be applied to product-out date prediction, improving accuracy thereof significantly.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A computer-implemented wafer-based planning method for batch-based processing tools, comprising:
providing planning data, comprising an operations level, a tool group set level, a tool group level, and a tool level, wherein the operations level comprises at least one operation and each operation corresponds to one tool group set in the tool group set level, one tool group in the tool group level, and one batch-based processing tool in the tool level; and
appending at least one tool group to the tool group level for each operation in the operations level, wherein the number of appended tool groups depends on the wafer capacity of the batch-based processing tool.

2. The computer-implemented wafer-based planning method for batch-based processing tools of claim 1, further appending tool group selection rules corresponding to the appended tool groups.

3. The computer-implemented wafer-based planning method for batch-based processing tools of claim 2, wherein when wafers arrive at the batch-based processing tool, a target tool group is selected from the tool groups from the tool group level according to the number of wafers and the tool group selection rules.

4. The computer-implemented wafer-based planning method for batch-based processing tools of claim 1, wherein the planning data is provided by a manufacturing execution system for the batch-based processing tools.

5. The computer-implemented wafer-based planning method for batch-based processing tools of claim 1, wherein the planning data with the appended tool groups is provided to the batch-based processing tools for wafer dispatch.

6. The computer-implemented wafer-based planning method for batch-based processing tools of claim 1, wherein the appended tool groups are indexed from one to the maximum wafer capacity of the batch-based processing tool.

7. A wafer-based planning system for batch-based processing tools, comprising:
a database providing planning data comprising an operations level, a tool group set level, a tool group level, and a tool level, wherein the operations level comprises at least one operation and each operation corresponds to one tool group set in the tool group set level, one tool group in the tool group level, and one batch-based processing tool in the tool level; and
an appending module, coupled to the database, appending at least one tool group to the tool group level for each operation in the operations level, wherein the number of the appended tool groups depends on the wafer capacity of the batch-based processing tool.

8. The wafer-based planning system for batch-based processing tools of claim 7, wherein the appending module further appends tool group selection rules corresponding to the appended tool groups.

9. The wafer-based planning system for batch-based processing tools of claim 8, wherein when wafers arrive at the batch-based processing tool, a target tool group is selected from the tool groups according to the number of wafers and the tool group selection rules.

10. The wafer-based planning system for batch-based processing tools of claim 7, wherein the database is provided by a manufacturing execution system for the batch-based processing tools.

11. The wafer-based planning system for batch-based processing tools of claim 7, wherein the planning data with the appended tool groups is provided to the batch-based processing tools for wafer dispatch.

12. The wafer-based planning system for batch-based processing tools of claim 7, wherein the appended tool groups are indexed from one to the maximum wafer capacity of the batch-based processing tool.

13. An integrated circuit product manufactured by a computer-implemented wafer-based planning method for batch-based processing tools, the method comprising:

providing planning data, comprising an operations level, a tool group set level, a tool group level, and a tool level, wherein the operations level comprises at least one operation and each operation corresponds to one tool group set in the tool group set level, one tool group in the tool group level, and one batch-based processing tool in the tool level; and appending at least one tool group to the tool group level for each operation in the operations level, wherein the number of the appended tool groups depends on the wafer capacity of the batch-based processing tool.

14. The integrated circuit product manufactured by a computer-implemented wafer-based planning method for batch-based processing tools of claim 13, the method further appending tool group selection rules corresponding to the appended tool groups.

15. The integrated circuit product manufactured by a computer-implemented wafer-based planning method for batch-based processing tools of claim 14, wherein when wafers arrive at the batch-based processing tool, a target tool group is selected from the tool groups according to the number of wafers and the tool group selection rules.

16. The integrated circuit product manufactured by a computer-implemented wafer-based planning method for batch-based processing tools of claim 13, wherein the planning data is provided by a manufacturing execution system for the batch-based processing tools.

17. The integrated circuit product manufactured by a computer-implemented wafer-based planning method for batch-based processing tools of claim 13, wherein the planning data with the appended tool groups is provided to the batch-based processing tools for wafer dispatch.

18. The integrated circuit product manufactured by a computer-implemented wafer-based planning method for batch-based processing tools of claim 13, wherein the appended tool groups are indexed from one to the maximum wafer capacity of the batch-based processing tool.

* * * * *